(12) United States Patent
Strandborg et al.

(10) Patent No.: US 12,493,198 B1
(45) Date of Patent: Dec. 9, 2025

(54) PARALLAX BARRIER WITH DYNAMIC LIGHT STEERING BASED ON RELATIVE LOCATION OF VIEWER

(71) Applicant: Distance Technologies Oy, Helsinki (FI)

(72) Inventors: Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/734,344

(22) Filed: Jun. 5, 2024

(51) Int. Cl.
  *G02B 30/30* (2020.01)
  *G02B 27/00* (2006.01)
  *H04N 13/31* (2018.01)

(52) U.S. Cl.
  CPC ......... *G02B 30/30* (2020.01); *G02B 27/0093* (2013.01); *H04N 13/31* (2018.05)

(58) Field of Classification Search
  CPC ..... G02B 30/30; G02B 27/0093; H04N 13/31
  See application file for complete search history.

(56) References Cited

U.S. PATENT DOCUMENTS

| 2004/0263968 A1 | 12/2004 | Kobayashi et al. |
| 2015/0222886 A1 | 8/2015 | Bathiche et al. |
| 2018/0199030 A1* | 7/2018 | Smith .................. H04N 13/398 |

FOREIGN PATENT DOCUMENTS

WO     2022182887 A1     9/2022

OTHER PUBLICATIONS

European Patent Office, Extended European Search Report, Application No. 25177306.5-1207, Dated Jul. 14, 2025, 10 Pages.

* cited by examiner

*Primary Examiner* — Charles S Chang
(74) *Attorney, Agent, or Firm* — ZIEGLER IP LAW GROUP

(57) ABSTRACT

A light field image is displayed via a light field display unit to produce a synthetic light field. A first viewing direction and a second viewing direction are determined for a given first photo-emitting cell and a given second photo-emitting cell of the light field display unit, based on a relative location of a first eye and a second eye with respect to an image plane of the light field display unit, respectively. A given first portion and a given second portion of an active optical element that lie respectively on optical paths of the given first photo-emitting cell and the given second photo-emitting cell are controlled, to direct light corresponding to the given first photo-emitting cell and light corresponding to the given second photo-emitting cell along the first viewing direction and the second viewing direction, respectively.

16 Claims, 5 Drawing Sheets

PARALLAX BARRIER WITH DYNAMIC LIGHT STEERING BASED ON RELATIVE LOCATION OF VIEWER

TECHNICAL FIELD

The present disclosure relates to systems employing parallax barriers with active optical elements that facilitate dynamic light steering based on relative locations of viewers. The present disclosure also relates to methods employing parallax barriers with active optical elements that facilitate dynamic light steering based on relative locations of viewers.

BACKGROUND

Existing autostereoscopy techniques often employ parallax barriers for generating autostereoscopic images to be presented to eyes of a given user. A parallax barrier comprises opaque portions and transparent portions, and is placed on an optical path of light emanating from a light-emitting unit of a light field display unit. The opaque portions selectively block light emanating from certain pixels of the light field display unit in certain directions, while the transparent portions allow said light to pass through in certain other directions. As the given user's eyes observe the light field display unit from slightly different viewing directions, each eye receives light emanating from a different set of pixels. This presents an autostereoscopic view to the given user.

However, robust autostereoscopy and multiscopy (namely, stereoscopy for multiple simultaneous viewers) is difficult to achieve using such existing autostereoscopy techniques. The problem is exacerbated when user(s) are located far away (for example, more than 1 metre away) from a light field display unit. This is because an angle that is formed between gaze vectors of a given user's eyes (when viewing light emanating from neighbouring pixels of the light field display unit) becomes exceedingly small (for example, in a range of 2 to 5 degrees, or even smaller) as a distance between the light field display unit and the given user increases. For robust autostereoscopy, it is desired that the light field display unit is able to display different virtual images to the eyes of the given user. As the room for error diminishes with increasing distances between the light field display unit and the given user, the existing autostereoscopy techniques struggle to achieve robust autostereoscopy.

Moreover, this problem is present even in case of a dynamic parallax barrier that is implemented using a Liquid Crystal (LC) layer. In case of dynamic parallax barriers, a resolution of the LC layer dictates a granularity of control for a precise location of each barrier (namely, each opaque portion). This causes problems with far-away viewers where an angle between gaze vectors for a given user becomes exceedingly small. In such cases, proper autostereoscopy would require the location of the barriers to be adjustable at subpixel accuracy. This leads to cross-talk and degrades colour reproduction of pixels of the virtual images, thereby leading to a sub-optimal autostereoscopic view.

Therefore, in light of the foregoing discussion, there exists a need to overcome the aforementioned drawbacks.

SUMMARY

The present disclosure seeks to provide a system and a method to present high-quality, accurate virtual images via a synthetic light field to eyes of one or more users, in a computationally-efficient and time-efficient manner, even when the one or more users are relatively far away (for example, more than 1 metre away) from a light field display unit. The aim of the present disclosure is achieved by a system and a method that employ a parallax barrier with an active optical element that facilitates dynamic light steering based on relative locations of users, as defined in the appended independent claims to which reference is made to. Advantageous features are set out in the appended dependent claims. Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
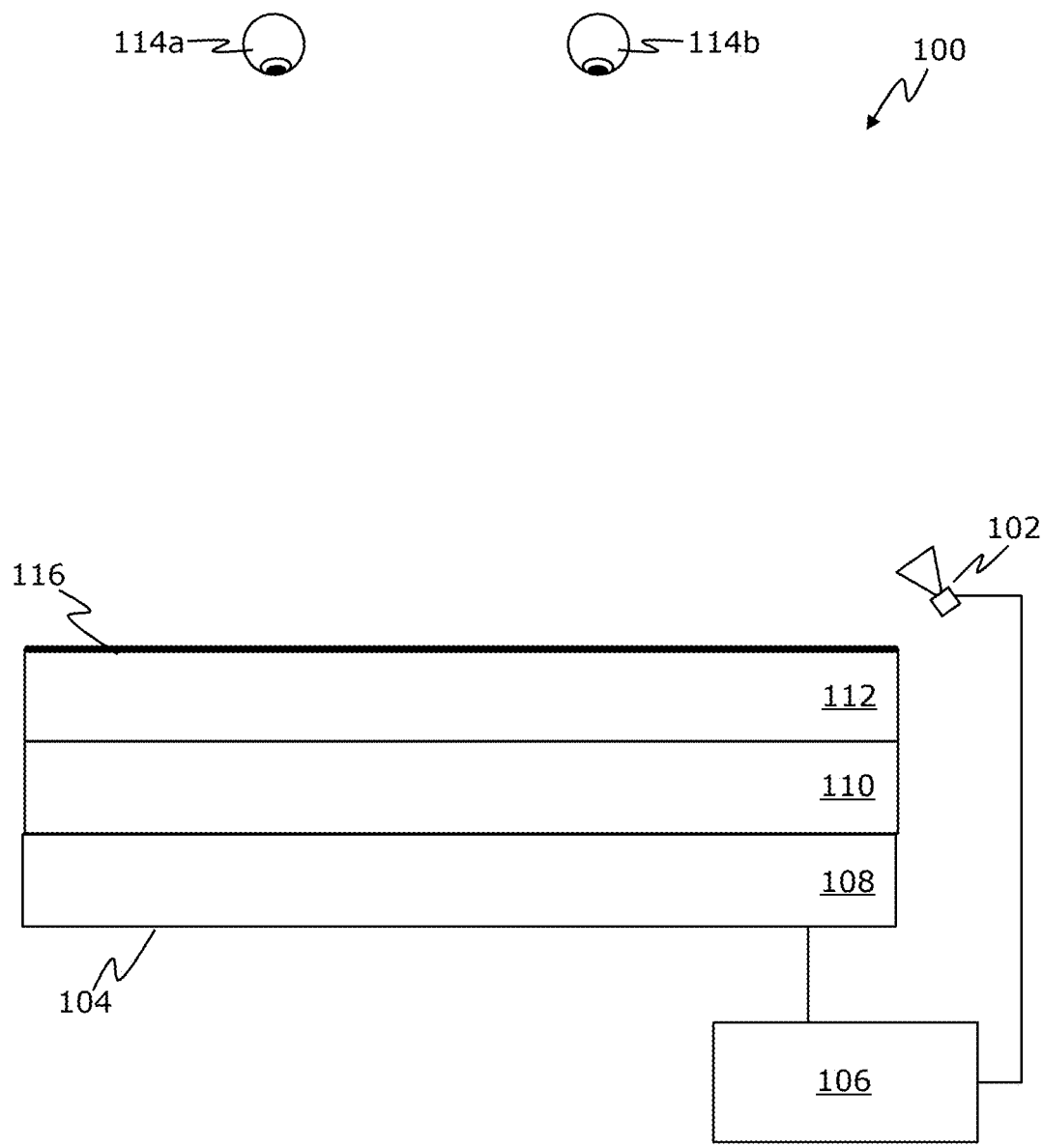
FIGS. 1A and 1B depict example implementations of a system incorporating dynamic light steering based on a relative location of a viewer, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  a light field display unit comprising:
    a light-emitting unit that is employed to emit light corresponding to a plurality of photo-emitting cells;
    a parallax barrier arranged on an optical path of the light-emitting unit, the parallax barrier comprising opaque portions and transparent portions; and
    an active optical element arranged on the optical path of the light-emitting unit; and at least one processor configured to:
utilise the tracking means to determine a relative location of a first eye and of a second eye of at least one user with respect to an image plane of the light field display unit; and
display a light field image via the light field display unit to produce a synthetic light field, whilst controlling the active optical element, based on the relative location of the first eye and of the second eye of the at least one user, to direct light corresponding to a first set of photo-emitting cells towards the first eye and light corresponding to a second set of photo-emitting cells towards the second eye,
wherein when controlling the active optical element, the at least one processor is configured to:
determine a first viewing direction and a second viewing direction for a given first photo-emitting cell belonging to the first set of photo-emitting cells and a given second photo-emitting cell belonging to the second set of photo-emitting cells, based on the relative location of the first eye and of the second eye of the at least one user with respect to the image plane of the light filed display unit, respectively; and
control a given first portion of the active optical element that lies on an optical path of the given first photo-emitting cell and a given second portion of the active optical element that lies on an optical path of the given second photo-emitting cell, to direct light corresponding to the given first photo-emitting cell along the first viewing direction and light corresponding to the given second photo-emitting cell along the second viewing direction, respectively, wherein the given first portion and the given second portion are controlled based on at least one of: (i) a relative location of a first group comprising a first opaque portion and a first transparent portion of the parallax barrier that correspond to the given first photo-emitting cell with respect to the first viewing direction, (ii) a relative location of a second group comprising a second opaque portion and a second transparent portion of the parallax barrier that correspond to the given second photo-emitting cell with respect to the second viewing direction, (iii) a width of an opaque portion and a transparent portion in the parallax barrier.

In a second aspect, an embodiment of the present disclosure provides a method comprising:
utilising tracking means to determine a relative location of a first eye and of a second eye of at least one user with respect to an image plane of a light field display unit, the light field display unit comprising a light-emitting unit, a parallax barrier arranged on an optical path of the light-emitting unit, and an active optical element arranged on the optical path of the light-emitting unit; and
displaying a light field image via the light field display unit to produce a synthetic light field, whilst controlling the active optical element, based on the relative location of the first eye and of the second eye of the at least one user, to direct light corresponding to a first set of photo-emitting cells of the light field display unit towards the first eye and light corresponding to a second set of photo-emitting cells of the light field display unit towards the second eye,
wherein the step of controlling the active optical element comprises:
determining a first viewing direction and a second viewing direction for a given first photo-emitting cell belonging to the first set of photo-emitting cells and a given second photo-emitting cell belonging to the second set of photo-emitting cells, based on the relative location of the first eye and of the second eye of the at least one user with respect to the image plane of the light filed display unit, respectively; and
controlling a given first portion of the active optical element that lies on an optical path of the given first photo-emitting cell and a given second portion of the active optical element that lies on an optical path of the given second photo-emitting cell, to direct light corresponding to the given first photo-emitting cell along the first viewing direction and light corresponding to the given second photo-emitting cell along the second viewing direction, respectively, wherein the given first portion and the given second portion are controlled based on at least one of: (i) a relative location of a first group comprising a first opaque portion and a first transparent portion of the parallax barrier that correspond to the given first photo-emitting cell with respect to the first viewing direction, (ii) a relative location of a second group comprising a second opaque portion and a second transparent portion of the parallax barrier that correspond to the given second photo-emitting cell with respect to the second viewing direction, (iii) a width of an opaque portion and a transparent portion in the parallax barrier.

The present disclosure provides the aforementioned system and the aforementioned method employing the parallax barrier with the active optical element, thereby facilitating dynamic light steering based on relative locations of eyes of the at least one user (namely, viewers), to present high-quality, accurate virtual images via the synthetic light field in a computationally-efficient and time-efficient manner. These technical benefits can be achieved even when the at least one user is relatively far away (for example, more than 1 metre away) from the light field display unit. By dynamically controlling the active optical element, the light is directed in a manner (according to the first viewing direction and the second viewing direction) that the eyes of the at least one user would perceive an autostereoscopic effect highly realistically and accurately when viewing the virtual images presented to the eyes of the at least one user. This allows for producing the autostereoscopic effect even when the eyes of the at least one user are located relatively far away (for example, more than 1 metre away) from the light field display unit, such that the angle formed between gaze vectors of the eyes (when viewing at neighbouring photo-emitting cells of the light field display unit) is relatively small (for example, in a range of 2 to 5 degrees, or even smaller). These technical benefits arise from a fact that without the active optical element, some pixels (of the light field image) may be only partially visible to a given user; beneficially, arranging the active optical element on the optical path allows to produce an effect that is similar to placing a boundary between a given opaque portion and a given transparent portion at an arbitrary granularity (irrespective of the width of the opaque portion and the transparent portion in the parallax barrier). In other words, this allows to produce an effect that is similar to aligning the boundary (between the given opaque portion and the given transparent portion) with a location of a pixel boundary in a most optimal way for a given viewing direction, without actually aligning said boundaries physically. Moreover, the system and the method are robust, fast, reliable, support real-time simultaneous presentation of virtual images (via the synthetic light field) to eyes of one or more users by way of employing dynamic light steering based on relative locations of the eyes.

Throughout the present disclosure, the term "parallax barrier" refers to a device that comprises an alternating arrangement of opaque portions and transparent portions. Parallax barriers are well-known in the art. Pursuant to embodiments of the present disclosure, the parallax barrier could be static or dynamic. In case of a static parallax barrier, the opaque portions and the transparent portions are located at fixed positions with respect to each other. In case of a dynamic parallax barrier, the opaque portions and the transparent portions can be adjusted actively. Such a dynamic parallax barrier could be implemented as an active liquid-crystal (LC) layer. In implementations where the light field display unit comprises a display with a backlight, and the light-emitting unit is the backlight, the parallax barrier can be arranged after the display on the optical path, or between the display and the backlight. In implementations where the light field display unit is a display without any backlight, and the light-emitting unit is the display, the parallax barrier is arranged after the display on the optical path.

Throughout the present disclosure, the term "active optical element" refers to an optical element that is controllable for actively directing (namely, steering) light corresponding to a given set of photo-emitting cells (emanating from the light-emitting unit) towards a given eye of a given user. It will be appreciated that the active optical element can be arranged before or after the parallax barrier on the optical path of the light-emitting unit. However, it will be appreciated that a limiting factor of a light steering ability of conventional light field display units is a resolution of the display and a resolution of the parallax barrier. Therefore, if the active optical element is arranged between the display and the parallax barrier, it is possible to fine-tune a direction of passage allowed by individual smallest units of a first layer (namely, one of the display and the parallax barrier), which then gets modulated by individual smallest units of a second layer (namely, another of the display and the parallax barrier). Hereinabove, individual smallest units of the display are the plurality of photo-emitting cells, while individual smallest units of the parallax barrier are groups of opaque portions and transparent portions that are adjacent to each other. Thus, it may be most beneficial to arrange the active optical element between the display and the parallax barrier, irrespective of an order in which the display and the parallax barrier are arranged.

On the other hand, it may also be practical and beneficial to arrange the active optical element after the parallax barrier on the optical path, because such an arrangement would allow to freely steer the light even at drastic angles, thereby facilitating a wider range of viewing positions of the eyes of the at least one user, even when the at least one user is far-away from the light field display unit.

As a first example implementation, the light field display unit comprises a display with a backlight (for example, such as an LCD or similar), the light-emitting unit is the backlight, and the parallax barrier is arranged after the display on the optical path. In such a case, the active optical element can be arranged before or after the parallax barrier on the optical path. This would lead to following possible arrangements:

(i) backlight→display→active optical element→parallax barrier, or (ii) backlight→display→parallax barrier→active optical element.

As a second example implementation, the light field display unit comprises a display with a backlight, the light-emitting unit is the backlight, and the parallax barrier is arranged between the backlight and the display. In such a case, the active optical element can be arranged either after the parallax barrier and the display on the optical path, or between the parallax barrier and the display. This would lead to following possible arrangements:

(iii) backlight→parallax barrier→display→active optical element, or (iv) backlight→parallax barrier→active optical element→display.

As a third example implementation, the light field display unit comprises a display without any backlight (for example, an OLED display or similar), the light-emitting unit is the display, and the parallax barrier is arranged after the display on the optical path. In such a case, the active optical element can be arranged before or after the parallax barrier on the optical path. This would lead to following possible arrangements:

(v) display→active optical element→parallax barrier, or (vi) display→parallax barrier→active optical element.

It will be appreciated that the aforementioned system and method work well with a static parallax barrier as well as a dynamic parallax barrier. Irrespective of whether the parallax barrier is static or dynamic, the active optical element is controlled to direct the light corresponding to the first set of photo-emitting cells of the light field display unit towards the first eye of the at least one user, while directing the light corresponding to the second set of photo-emitting cells of the light field display unit towards the second eye of the at least one user. It will be appreciated that the light is directed twice, namely once by the parallax barrier and once by the active optical element (irrespective of an order in which the parallax barrier and the active optical element are arranged), thereby allowing for very precise control and re-directing of the light along the given viewing direction (namely, the first viewing direction and the second viewing direction).

As an example, in an implementation where the active optical element is arranged after the parallax barrier on the optical path of the light-emitting unit, a given opaque portion of the parallax barrier selectively blocks light corresponding to a given photo-emitting cell of the light field display unit in certain directions, while a given transparent portion of the parallax barrier (that is adjacent to the given opaque portion) allows said light to pass through in certain other directions. Upon passing through the given transparent portion of the parallax barrier, the light is then directed by a given portion of the active optical element (lying on an optical path of the given photo-emitting cell) towards a given eye along a given viewing direction.

Optionally, the active optical element is implemented as a liquid-crystal (LC) optical element. The LC optical element enables in directing light passing therethrough by adjusting a refractive index of an LC material in the LC optical element. In this regard, the refractive index of the LC material can be controlled electrically. Optionally, the LC optical element is implemented as at least one LC layer. In some implementations, the LC optical element could be implemented as two LC layers. In an example, the LC optical element may be implemented as a switchable LC shutter array. Electrically controlling the LC material to redirect light incident thereupon is well-known in the art.

The technical benefit of implementing the LC optical element is that the LC material in the LC optical element could be easily and conveniently controlled (electrically) to direct the light very precisely, irrespective of any relative location of the eyes of the at least one user. This potentially enables in displaying highly accurate and realistic virtual images to the eyes of the at least one user.

Throughout the present disclosure, the term "tracking means" refers to specialised equipment for detecting and/or following a location of at least a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracking means. When different types of images captured by the various different types of tracking cameras are utilised, a location of user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images.

It will be appreciated that the at least one tracking camera is arranged to face the at least one user, to facilitate tracking of the location of the user's eyes. A relative location of the at least one tracking camera with respect to the image plane (namely, an imaginary plane on which the virtual images are to be presented to the first eye and the second eye) of the light field display unit is pre-known. This enables to determine the relative location of the first eye and of the second eye of the at least one user with respect to the image plane. Optionally, in this regard, when the tracking means are utilised to detect and/or follow the location of the first eye and of the second eye, a location of the first eye and of the second eye with respect to the at least one tracking camera is accurately known. Thus, the relative location of the first eye and of the second eye with respect to the image plane can be determined, based on the relative location of the at least one tracking camera with respect to the image plane and the location of the first eye and of the second eye with respect to the at least one tracking camera. Such a determination may utilise a coordinate geometry-based technique and/or a trigonometry-based technique. It will be appreciated that the tracking means tracks both eyes of the at least one user with a significantly high accuracy and precision, such that an error in determining the relative location may, for example, be minimised to within a tolerance range of approximately (+/−) 8 millimetres.

It will be appreciated that the tracking means is employed to repeatedly track the location of the first eye and the second eye of the given user throughout a given session of using the system. This allows for repeatedly determining the relative location of the first eye and of the second eye with respect to the image plane in real time or near-real time. Beneficially, this subsequently allows for presenting the at least one user with the synthetic light field in an autostereoscopic manner. It is to be understood that when the synthetic light field is being produced for a plurality of users simultaneously, relative locations of both eyes of each user from amongst the plurality of users are determined in a same manner as discussed hereinabove.

The at least one processor controls an overall operation of the system. The at least one processor is communicably coupled to the tracking means and the light field display unit (specifically, to a driving circuit of the light-emitting unit and a driving circuit of the active optical element). Optionally, the at least one processor is implemented as a processor of the light field display unit. Alternatively, optionally, the at least one processor is implemented as a processor of a computing device that is communicably coupled to the light field display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "light field display unit" refers to specialised equipment that is capable of producing the synthetic light field. In other words, the light field display unit is utilised to display the light field image (which may be generated by the at least one processor) to produce the synthetic light field presenting the virtual images at a given resolution.

Throughout the present disclosure, the term "light-emitting unit" refers to a component of the light field display unit that emits light. It is to be understood that said light is emitted corresponding to the plurality of photo-emitting cells of the light field display unit. As mentioned earlier, the light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. As an example, in case of an LCD, the light field display unit comprises a backlight and an LCD panel, and the light-emitting unit is the backlight, wherein the backlight and the LCD panel are used in conjunction to produce intensities of light corresponding to the plurality of photo-emitting cells. In such a case, the plurality of photo-emitting cells are implemented as a combination of the backlight and LC cells in the LCD panel. As another example, in case of a micro-LED-based display, the light-emitting unit comprises an array of micro LEDs, wherein the plurality of photo-emitting cells are implemented as the micro-LEDs of said array.

Optionally, the at least one processor is configured to generate the light field image, based on the relative location of the first eye and of the second eye of the at least one user with respect to the image plane of the light field display unit. The light field image may be understood to be a two-dimensional (2D) image comprising a plurality of pixels, wherein a first set of pixels from amongst the plurality of pixels is responsible for generating a first part of the synthetic light field that corresponds to the first eye, and a second set of pixels from amongst the plurality of pixels is responsible for generating a second part of the synthetic light field that corresponds to the second eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the first eye as well as the second eye of the at least one user.

In some implementations, virtual content presented by the synthetic light field corresponds to a virtual environment comprising at least one virtual object. Optionally, in this regard, the at least one processor is configured to generate the light field image from a perspective of the relative location of the first eye and the second eye of the at least one user with respect to the image plane, by employing a three-dimensional (3D) model of the virtual environment. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first virtual image and the second virtual image to be presented to the first eye and the second eye of the at least one user in a form of 2D user interface (UI) elements, and utilise the first virtual image and the second virtual image to generate the light field image. The 2D UI elements could pertain to, for example, a virtual navigation tool, a virtual gadget, a virtual message, a virtual entity, a virtual entertainment media, a virtual information, or similar.

Furthermore, optionally, when generating the light field image, the at least one processor is configured to determine, within the light field image, a position of a given pixel of the first set and a position of a given pixel of the second set that correspond to a given synthetic three-dimensional (3D) point, based on an interpupillary distance between the first eye and the second eye of the at least one user and an optical depth at which the given synthetic 3D point is to be displayed. The technical benefit of determining said positions is that the given synthetic 3D point can be presented accurately and realistically, by utilising binocular disparity, based on the interpupillary distance and the optical depth at which the given synthetic 3D point is to be displayed.

In implementations where the virtual content presented by the synthetic light field corresponds to the at least one virtual object, the at least one processor is configured to determine a colour of the given pixel of the first set and a colour of the given pixel of the second set, by employing the 3D model of the virtual environment. Optionally, a colour of a given pixel is represented by a colour value. Such a colour value could, for example, be an RGB value, an RGB-A value, a CMYK value, a YUV value, an RGB-D value, an RYYB value, an RGGB value, an RGB-IR value, or similar. Optionally, the at least one processor is configured to employ at least one neural network for determining the colour of the given pixel. Optionally, the at least one neural network is implemented as a Neural Radiance Field (NeRF) model. The NeRF model is well-known in the art.

Throughout the present disclosure, the term "synthetic light field" refers to a light field that is produced (namely, generated) synthetically by the light field display unit. In case of the synthetic light field, light emanating from the light-emitting unit is incident, upon being directed once by the parallax barrier and once by the active optical element, towards the first eye and the second eye of the at least one user, as discussed earlier. In this way, visual information pertaining to the at least one virtual object (namely, the virtual images) can be perceived by the first eye and the second eye.

Moreover, optionally, the first viewing direction for the given first photo-emitting cell belonging to the first set of photo-emitting cells and the second viewing direction for the given second photo-emitting cell belonging to the second set of photo-emitting cells are determined further based on a location of the given first photo-emitting cell and a location of the given second photo-emitting cell in the light-emitting unit, respectively. The technical benefit of utilising the aforesaid locations is that the first viewing direction and the second viewing direction are determined highly accurately, thereby allowing for controlling light steering for different regions of the light-emitting unit at a finer granular level. In other words, an amount of bending (namely, to direct the light) is varied across the different regions of the light-emitting unit, in order to direct an entire stereoscopic viewing area of the light field display unit towards the eyes of the at least one user. Due to this, it is ensured that the light corresponding to the given first photo-emitting cell and the light corresponding to the given second photo-emitting cell can be precisely directed along the first viewing direction and the second viewing direction, respectively, towards the first eye and the second eye.

Since information pertaining to a field of view of the light-emitting unit is already pre-known, a relative location of each photo-emitting cell of the light-emitting unit with respect to a centre of the light-emitting unit (through which an optical axis of the light-emitting unit passes) can be determined. In addition to this, the relative location of the first eye and of the second eye with respect to the image plane of the light field display unit are also accurately known. This enables to accurately determine the first viewing direction and the second viewing direction, for example, by mapping a given first vector that originates from the location of the first eye to the location of the given first photo-emitting cell for determining the first viewing direction; and by mapping a given second vector that originates from the location of the second eye to the location of the given second photo-emitting cell for determining the second viewing direction. It is to be understood that different first photo-emitting cells of the first set would have different first viewing directions, depending on their respective relative locations on the light-emitting unit with respect to the centre of the light-emitting unit; similarly, different second photo-emitting cells of the second set would have different second viewing directions, depending on their respective relative locations on the light-emitting unit with respect to the centre of the light-emitting unit.

It will be appreciated that the given second photo-emitting cell could be neighbouring the given first photo-emitting cell on the light-emitting unit, for example, in a single user case. However, the given second photo-emitting cell need not be neighbouring the given first photo-emitting cell. The first transparent portion is adjacent to the first opaque portion, while the second transparent portion is adjacent to the second opaque portion. It will also be appreciated that the first transparent portion and the second transparent portion may refer to a same gap in the parallax barrier, depending on the first viewing direction and the second viewing direction, and whether the given second photo-emitting cell is neighbouring the given first photo-emitting cell.

In implementations where the parallax barrier is static, the given first portion and the given second portion of the active optical element can be controlled based on (i) the relative location of the first group comprising the first opaque portion and the first transparent portion that correspond to the given first photo-emitting cell with respect to the first viewing direction, (ii) the relative location of the second group comprising the second opaque portion and the second transparent portion that correspond to the given second photo-emitting cell with respect to the second viewing direction, and (iii) the width of the opaque portion and the transparent portion in the parallax barrier. In such implementations, the relative location (namely, (i)) of the first group with respect to the first viewing direction is taken into consideration to determine an amount of bending that is to be performed by the given first portion to direct the light corresponding to the given first photo-emitting cell along the first viewing direction and towards the first eye. Such determination also takes into account the width (namely (iii)) of the opaque portion and the transparent portion, because it allows for determining a width of the first transparent portion that is available for said light to pass therethrough. Likewise, the relative location (namely, (ii)) of the second group with respect to the second viewing direction is taken into consideration to determine an amount of bending that is to be performed by the given second portion to direct the light corresponding to the given second photo-emitting cell along the second viewing direction and towards the second eye. Such determination also takes into account the width (namely (iii)) of the opaque portion and the transparent portion, because it allows for determining a width of the second transparent portion that is available for said light to pass therethrough.

In implementations where the parallax barrier is dynamic, the given first portion and the given second portion of the active optical element can be controlled based on (iii) the width of the opaque portion and the transparent portion in the parallax barrier. This is because in case of a dynamic parallax barrier implemented using an LC layer, the resolution of the LC layer dictates a granularity of control for a precise location of each opaque portion and each transparent portion. Thus, the width of the opaque portion and the transparent portion is an integer multiple of a width of an LC cell in the LC layer. In other words, a boundary between a given opaque portion and a given transparent portion (that is adjacent to the given opaque portion) is positioned at a boundary of an LC cell. It is noteworthy that without the active optical element, this may cause some pixels (of the light field image) to be only partially visible to a given user. Beneficially, arranging the active optical element on the optical path allows to produce an effect that is similar to placing the boundary between the given opaque portion and the given transparent portion at an arbitrary granularity (irrespective of the width of the LC cell in the LC layer), In other words, this allows to produce an effect that is similar to aligning the boundary (between the given opaque portion and the given transparent portion) with a location of a pixel boundary in a most optimal way for a given viewing direction, without actually aligning said boundaries physically. Moreover, this width not only allows for determining the given first portion that corresponds to the given first photo-emitting cell and the given second portion that corresponds to the given second photo-emitting cell, but also allows for determining the width of the transparent portion that is available for the light to pass therethrough.

Optionally, the system further comprises an optical combiner arranged on an optical path of the light field display unit and on an optical path of a real-world light field of a real-world environment, wherein the optical combiner is employed to reflect the light corresponding to the first set of photo-emitting cells and the light corresponding to the second set of photo-emitting cells towards the first eye and the second eye, respectively, whilst optically combining the real-world light field with the first part of the synthetic light field produced by the light corresponding to the first set of photo-emitting cells and with the second part of the synthetic light field produced by the light corresponding to the second set of photo-emitting cells.

The optical combiner could be implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to the image plane of the light field display unit lies in a range of 10 degrees and 75 degrees.

It will be appreciated that when the optical combiner reflects the light corresponding to the first set of photo-emitting cells towards the first eye, it means that the first part of the synthetic light field is directed towards the first eye upon reflecting off the optical combiner. Simultaneously, when the optical combiner reflects the light corresponding to the second set of photo-emitting cells towards the second eye, it means that the second part of the synthetic light field is directed towards the second eye upon reflecting off the optical combiner. Therefore, upon said reflection of the first part and the second part of the synthetic light field, the virtual images are presented to the first eye and the second eye, respectively. Additionally, when the first part and the second part of the synthetic light field are optically combined with the real-world light field, virtual content represented in the first virtual image and the second virtual image is perceived by the left eye and the right eye, respectively, along with perceiving visual information pertaining to real-world objects present in the real-world environment. Advantageously, this provides a result that is similar to displaying a combined view of a virtual image augmenting a real-world image to the at least one user.

The term "real-world light field" refers to a light field emanating from the real-world environment in which the at least one user is present. It will be appreciated that in case of the real-world light field, light from, for example, a natural light source (such as the Sun) and/or an artificial light source (such as a lamp, a bulb, a tube-light, or similar), are reflected off the real-world objects (or their portions) to be incident towards the first eye and the second eye of the at least one user. In this way, visual information (for example, such as colour information, optical depth information, and the like) pertaining to said real-world objects is typically perceived by the left eye and the right eye.

Moreover, optionally, the at least one user comprises a plurality of users, wherein the at least one processor is configured to display different light field images for different users via the light field display unit, whilst controlling the active optical element, based on relative locations of first eyes and second eyes of the different users, by employing temporal multiplexing. In this regard, in a multi-user scenario, the different light field images are displayed for the different users in a time-based interleaving manner. This means that a given light field image from amongst the different light field images is displayed for a given user from amongst the different users in a given time slot. It is to be understood that when the given light field image is displayed for the given user, corresponding virtual images are presented to eyes of the given user; notably, the given user does not see the given light field image itself. In this regard, the parallax barrier (when dynamic) and/or the active optical element are controlled to present the virtual images to the eyes of the given user only, whilst blocking the light from reaching eyes of other user(s).

In an example case where there are two users, the active optical element can be controlled to direct light emanating from the light-emitting unit towards eyes of a first user and towards eyes of a second user in an alternating manner. In such a case, when a sequence of light field images are be displayed via the light field display unit at a frame rate of 120 frames per second (FPS), an effective frame rate of displaying the light field images for each of the two users would be 60 FPS due to temporal multiplexing. In the sequence of light field images, every odd-numbered light field image (comprising a first light field image, a third light field image, a fifth light field image, and so on of said sequence) is displayed for one of the two users at odd-numbered time slots (namely, a first time slot, a third time slot, a fifth time slot and so on), whereas every even-numbered light field image (comprising a second light field image, a fourth light field image, a sixth light field image, and so on of said sequence) is displayed for another of the two users at even-numbered time periods (namely, a second time slot, a fourth time slot, a sixth time slot, and so on). In other words, the light field images are displayed for each of the two users in alternating time slots. It will be appreciated that employing the temporal multiplexing in the aforesaid manner is feasible because light corresponding to neighbouring photo-emitting cells can be directed towards a given user in a narrow angle due to precise and accurate image steering capability of the active optical element. It will also be appreciated that when the temporal multiplexing is employed, even when a frame rate per user would be slightly lesser as compared to a native frame rate of the light field display unit, a given light field image would be displayed for a given user at a maximum resolution (namely, a resolution per eye or per user would be significantly higher), as compared to a scenario when a same light field image is displayed for the different users simultaneously. As a result, an overall viewing experience of each user would still be considerably realistic and immersive.

Furthermore, optionally, the at least one user comprises a plurality of users, wherein the at least one processor is configured to:
   detect when eyes of at least one of the plurality of users are closed or the at least one of the plurality of users is not looking towards the image plane; and
   when it is detected that the eyes of the at least one of the plurality of users are closed or the at least one of the plurality of users is not looking towards the image plane,
      identify a given photo-emitting cell that corresponds to a given eye of the at least one of the plurality of users; and
      dim the given photo-emitting cell, whilst skipping controlling a given portion of the active optical element that lies on an optical path of the given photo-emitting cell.

In this regard, the tracking data collected by the tracking means could be utilised to detect when the eyes of the at least one of the plurality of users are closed. Optionally, in this regard, when the tracking data comprises a plurality of images of a given eye of a given user from amongst the plurality of users, the at least one processor is configured to: extract a plurality of features of the given eye from a given image; and identify at least one of: a pupil of the given eye, a curvature of an eyelid of the given eye, a position of an eyelash of the given eye, a shape of the given eye, a size of the given eye, based on the plurality of features, to detect when the given eye of the given user is closed. It will be appreciated that the plurality of features of the given eye allow for easy identification of at least a part of the given eye. In an example, the given eye of the given user is detected to be closed when the pupil of the given eye is not identified/visible in the given image. Optionally, the at least one processor is configured to employ at least one data processing algorithm for extracting the plurality of features from the given image. Examples of the at least one data processing algorithm include, but are not limited to, an edge-detection algorithm, a corner-detection algorithm, a feature descriptor algorithm, a feature detector algorithm. Techniques for detecting closed eyes of users using eye tracking is well-known in the art.

It will be appreciated that at some time instants, the at least one of the plurality of users may not be looking towards the image plane (namely, the virtual images presented at the image plane). Optionally, in this regard, the at least one processor is configured to utilise the tracking means to determine a gaze direction of the given eye of the given user. Therefore, by repeatedly determining the gaze direction of the given eye, it could easily be ascertained when a gaze of the at least one of the plurality of users aligns with (namely, conforms to) a location of the image plane (whereon the virtual images are being presented), as then it may be highly likely that the at least one of the plurality of users is looking towards the virtual images. When the gaze of the at least one of the plurality of users is directed elsewhere (than the image plane or the virtual images), it is detected that the at least one of the plurality of users is not looking towards the image plane.

Thus, when it is detected that the eyes are closed or the at least one of the plurality of users is not looking towards the optical combiner, it means that the at least one of the plurality of users is not viewing the virtual images presented by the synthetic light field, and thus displaying a given set of pixels of the light field image corresponding to the at least one of the plurality of users is not required. In this regard, the given photo-emitting cell that corresponds to the given eye of the at least one of the plurality of users can be dimmed, such that either the given photo-emitting cell would display black (i.e., no light) or near-black. Dimming of photo-emitting cells is well-known in the art. Advantageously, dimming the given photo-emitting cell for the at least one of the plurality of users enables in minimising a potential light leakage from the given photo-emitting cell and, therefore, in improving an overall contrast in virtual images that are being displayed to other remaining user(s) from amongst the plurality of users. The potential light leakage is minimised, as by keeping an inactive photo-emitting cell dim, it acts as a barrier to prevent leaking/straying of the light into neighbouring parts of the synthetic light field. This may also potentially facilitate in saving processing resources and processing time of the at least one processor.

It will be appreciated that in case of the plurality of users, it is known which photo-emitting cells of the light-emitting surface correspond to a first eye of each of the plurality of users and which photo-emitting cells of the light-emitting surface correspond to a second eye of each of the plurality of users (i.e., within the light-emitting unit, locations of photo-emitting cells corresponding to eyes of each of the plurality of users are known). Thus, the given photo-emitting cell that corresponds to the given eye of the at least one of the plurality of users can be easily identified.

Alternatively, optionally, the at least one user comprises a plurality of users, wherein the at least one processor is configured to:
  detect when eyes of at least one of the plurality of users are closed or the at least one of the plurality of users is not looking towards the image plane; and
  when it is detected that the eyes of the at least one of the plurality of users are closed or the at least one of the plurality of users is not looking towards the image plane,
    identify a given photo-emitting cell that corresponds to a given eye of the at least one of the plurality of users; and
    utilise the given photo-emitting cell to produce additional light to supplement light emanating from a given neighbouring photo-emitting cell that corresponds to at least one other of the plurality of users, whilst controlling a given portion of the active optical element that lies on an optical path of the given photo-emitting cell, based on a viewing direction for the given neighbouring photo-emitting cell, to direct light emanating from the given photo-emitting cell along said viewing direction.

In this regard, when eyes of the at least one other of the plurality of users are open and the at least one other of the plurality of users is actually looking towards the virtual images, the given photo-emitting cell corresponding to the given eye of the at least one of the plurality of users could be utilised to produce the additional light to supplement the light emanating from the given neighbouring photo-emitting cell that corresponds to the at least one other of the plurality of users. In such a case, the given portion of the active optical element is controlled accordingly, to direct the light emanating from the given photo-emitting cell to supplement the light emanating from the given neighbouring photo-emitting cell. The technical benefit of the aforesaid supplementation is that the light emanating from the given photo-emitting cell could be harnessed purposefully (in the aforesaid manner) to significantly improve an overall visual quality (for example, in terms of a resolution, a brightness, and the like) of virtual images in specific viewing directions/positions, for the at least one other of the plurality of users. It is to be noted that the light emanating from the given photo-emitting cell can be directed in said viewing direction because the given photo-emitting cell and the given neighbouring photo-emitting cell are neighbouring photo-emitting cells within the light-emitting unit (i.e., the given photo-emitting cell is adjacent to the given neighbouring photo-emitting cell that corresponds to a given eye of the at least one other of the plurality of users). Moreover, the additional light emitted from the given photo-emitting cell may, for example, be of a same or similar colour/intensity as that of the given neighbouring photo-emitting cell.

Moreover, optionally, the at least one processor is configured to:
  control at least one third portion of the active optical element that is adjacent to said given first portion of the active optical element, to block a diffracted part of the light corresponding to the given first photo-emitting cell; and
  control at least one fourth portion of the active optical element that is adjacent to said given second portion of the active optical element, to block a diffracted part of the light corresponding to the given second photo-emitting cell.

Diffraction occurs when light passes through a narrow gap, namely, when the light corresponding to the given first photo-emitting cell passes through the first transparent portion, and when the light corresponding to the given second photo-emitting cell passes through the second transparent portion. A technical benefit of controlling the at least one third portion and the at least one fourth portion of the active optical element to block respective diffracted parts of the light is that diffraction is mitigated, thereby reducing light leakage and crosstalk. This improves an overall visual quality of the virtual images presented to the at least one user.

It will be appreciated that the at least one third portion could comprise two separate third portions, one on each side of the given first portion of the active optical element; likewise, the at least one fourth portion could comprise two separate fourth portions, one on each side of the given second portion of the active optical element. In a case where the active optical element is implemented as an LC optical element, the aforesaid portions could be in a form of individual LC cells.

Alternatively or additionally, the amount of bending that is to be performed by the given first portion of the active optical element (to direct the light corresponding to the given first photo-emitting cell along the first viewing direction and towards the first eye) can be reduced. Likewise, the amount of bending that is to be performed by the given second portion of the active optical element (to direct the light corresponding to the given second photo-emitting cell along the second viewing direction and towards the second eye) can be reduced. Optionally, in this regard, when determining the first viewing direction and the second viewing direction, the at least one processor is configured to take into account an amount of light leakage caused by diffraction of the light at edges of the first transparent portion and at edges of the second transparent portion.

The present disclosure also relates to the method as described above. Various embodiments and variants disclosed above, with respect to the aforementioned first aspect, apply mutatis mutandis to the method.

Optionally, the first viewing direction for the given first photo-emitting cell belonging to the first set of photo-emitting cells and the second viewing direction for the given second photo-emitting cell belonging to the second set of photo-emitting cells are determined further based on a location of the given first photo-emitting cell and a location of the given second photo-emitting cell in the light-emitting unit, respectively.

Optionally, in the method, an optical combiner is employed to reflect the light corresponding to the first set of photo-emitting cells and the light corresponding to the second set of photo-emitting cells towards the first eye and the second eye, respectively, whilst optically combining a real-world light field of a real-world environment with a first part of the synthetic light field produced by the light corresponding to the first set of photo-emitting cells and with a second part of the synthetic light field produced by the light corresponding to the second set of photo-emitting cells, wherein the optical combiner is arranged on an optical path of the light field display unit and on an optical path of the real-world light field of the real-world environment.

Optionally, the at least one user comprises a plurality of users, wherein the method further comprises displaying different light field images for different users via the light field display unit, whilst controlling the active optical element, based on relative locations of first eyes and second eyes of the different users, by employing temporal multiplexing.

In an embodiment, the at least one user comprises a plurality of users, wherein the method further comprises:
  detecting when eyes of at least one of the plurality of users are closed or the at least one of the plurality of users is not looking towards the image plane; and
  when it is detected that the eyes of the at least one of the plurality of users are closed or the at least one of the plurality of users is not looking towards the image plane,
    identifying a given photo-emitting cell that corresponds to a given eye of the at least one of the plurality of users; and
    dimming the given photo-emitting cell, whilst skipping controlling a given portion of the active optical element that lies on an optical path of the given photo-emitting cell.

In another embodiment, the at least one user comprises a plurality of users, wherein the method further comprises:
  detecting when eyes of at least one of the plurality of users are closed or the at least one of the plurality of users is not looking towards the image plane; and
  when it is detected that the eyes of the at least one of the plurality of users are closed or the at least one of the plurality of users is not looking towards the image plane,
    identifying a given photo-emitting cell that corresponds to a given eye of the at least one of the plurality of users; and
    utilising the given photo-emitting cell to produce additional light to supplement light emanating from a given neighbouring photo-emitting cell that corresponds to at least one other of the plurality of users, whilst controlling a given portion of the active optical element that lies on an optical path of the given photo-emitting cell, based on a viewing direction for the given neighbouring photo-emitting cell, to direct light emanating from the given photo-emitting cell along said viewing direction.

Optionally, in the method, the active optical element is implemented as a liquid-crystal optical element.

Optionally, the method further comprises:
  controlling at least one third portion of the active optical element that is adjacent to said given first portion of the active optical element, to block a diffracted part of the light corresponding to the given first photo-emitting cell; and
  controlling at least one fourth portion of the active optical element that is adjacent to said given second portion of the active optical element, to block a diffracted part of the light corresponding to the given second photo-emitting cell.

DETAILED DESCRIPTION OF THE DRAWINGS

Figure 1B:
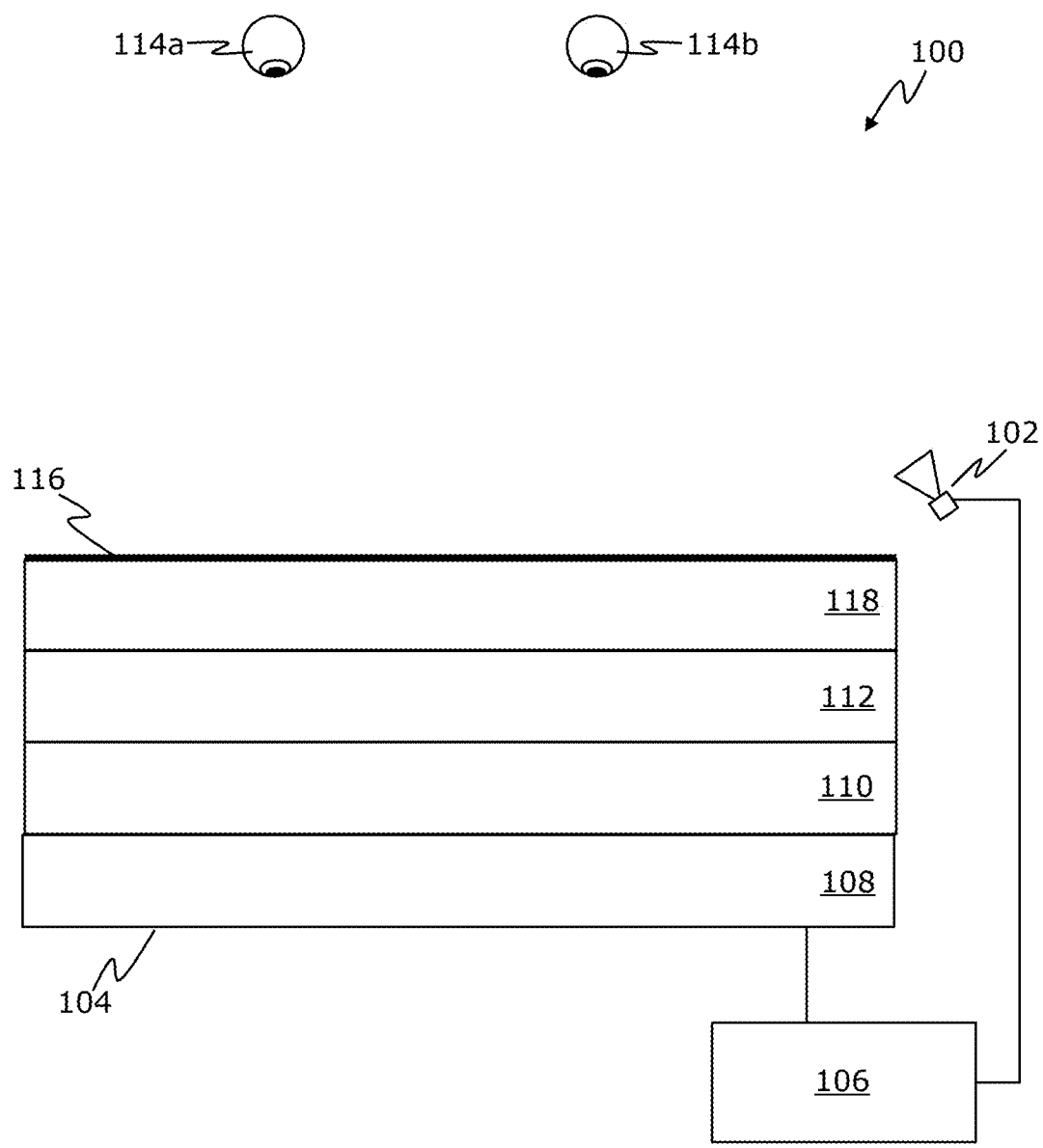

Referring to FIGS. 1A and 1B, illustrated are two example implementations of a system 100 incorporating dynamic light steering based on a relative location of a viewer (namely, eyes of at least one user), in accordance with an embodiment of the present disclosure. The system 100 comprises tracking means 102, a light field display unit 104 and at least one processor, depicted as a processor 106. The light field display unit 104 comprises a light-emitting unit 108 that is employed to emit light corresponding to a plurality of photo-emitting cells, a parallax barrier 110 arranged on an optical path of the light-emitting unit 108, and an active optical element 112 arranged on the optical path of the light-emitting unit 108. The processor 106 is configured to:
  utilise the tracking means 102 to determine a relative location of a first eye 114a and of a second eye 114b of at least one user with respect to an image plane 116 of the light field display unit 104; and
  display a light field image via the light field display unit 104 to produce a synthetic light field, whilst controlling the active optical element 112, based on the relative location of the first eye 114a and of the second eye 114b of the at least one user, to direct light corresponding to a first set of photo-emitting cells towards the first eye 114a and light corresponding to a second set of photo-emitting cells towards the second eye 114b,
wherein when controlling the active optical element 112, the processor 106 is configured to:
  determine a first viewing direction and a second viewing direction for a given first photo-emitting cell belonging to the first set of photo-emitting cells and a given second photo-emitting cell belonging to the second set of photo-emitting cells, based on the relative location of the first eye 114a and of the second eye 114b of the at least one user with respect to the image plane 116 of the light filed display unit 104, respectively; and
  control a given first portion of the active optical element 112 that lies on an optical path of the given first photo-emitting cell and a given second portion of the active optical element 112 that lies on an optical path of the given second photo-emitting cell, to direct light corresponding to the given first photo-emitting cell along the first viewing direction and light corresponding to the given second photo-emitting cell along the second viewing direction, respectively, wherein the given first portion and the given second portion are controlled based on at least one of: (i) a relative location of a group comprising a first opaque portion and a first transparent portion of the parallax barrier 110 that correspond to the given first photo-emitting cell with respect to the first viewing direction, (ii) a relative location of a group comprising a second opaque portion and a second transparent portion of the parallax barrier 110 that correspond to the given second photo-emitting cell with respect to the second viewing direction, (iii) a width of an opaque portion and a transparent portion in the parallax barrier 110.

FIG. 1A depicts an implementation where the light field display unit 104 comprises a display without any backlight, the light-emitting unit 108 is the display, and the parallax barrier 110 is arranged after the display on the optical path. In such an implementation, the active optical element 112 can be arranged before or after the parallax barrier 110 on the optical path. With reference to FIG. 1A, the active optical element 112 is shown to be arranged after the parallax barrier 110 on the optical path.

FIG. 1B depicts another implementation where the light field display unit 104 comprises a display 118 with a backlight, and the light-emitting unit 108 is the backlight. In such a case, the parallax barrier 110 can be arranged after the display 118 on the optical path, or between the display 118 and the backlight (namely, the light-emitting unit 108). With reference to FIG. 1B, the parallax barrier 110 is shown to be arranged between the display 118 and the backlight (namely, the light-emitting unit 108), and the active optical element 112 is shown to be arranged after the parallax barrier 110 on the optical path.

It may be understood by a person skilled in the art that FIGS. 1A and 1B merely depict two example implementations (out of many possible implementations) of the system 100, for sake of clarity, which should not unduly limit the scope of the claims herein. It is to be understood that the specific implementation of the system 100 is not to be construed as limiting it to specific numbers or types of tracking means, light field display units, processors, light-emitting units, parallax barriers, and active optical elements. The person skilled in the art will recognize many variations, alternatives, and modifications of embodiments of the present disclosure. As mentioned earlier, the active optical element 112 can be arranged anywhere on the optical path of the light-emitting unit 108.

Figure 2A:
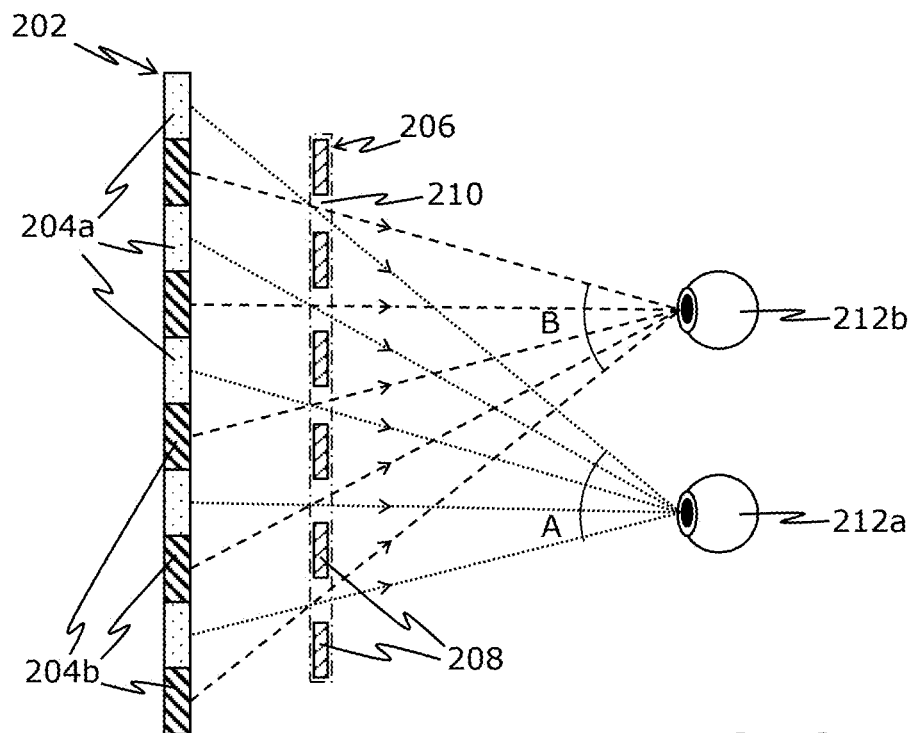
FIGS. 2A and 2B depict how light can be dynamically steered using an active optical element, in accordance with an embodiment of the present disclosure.
Figure 2B:
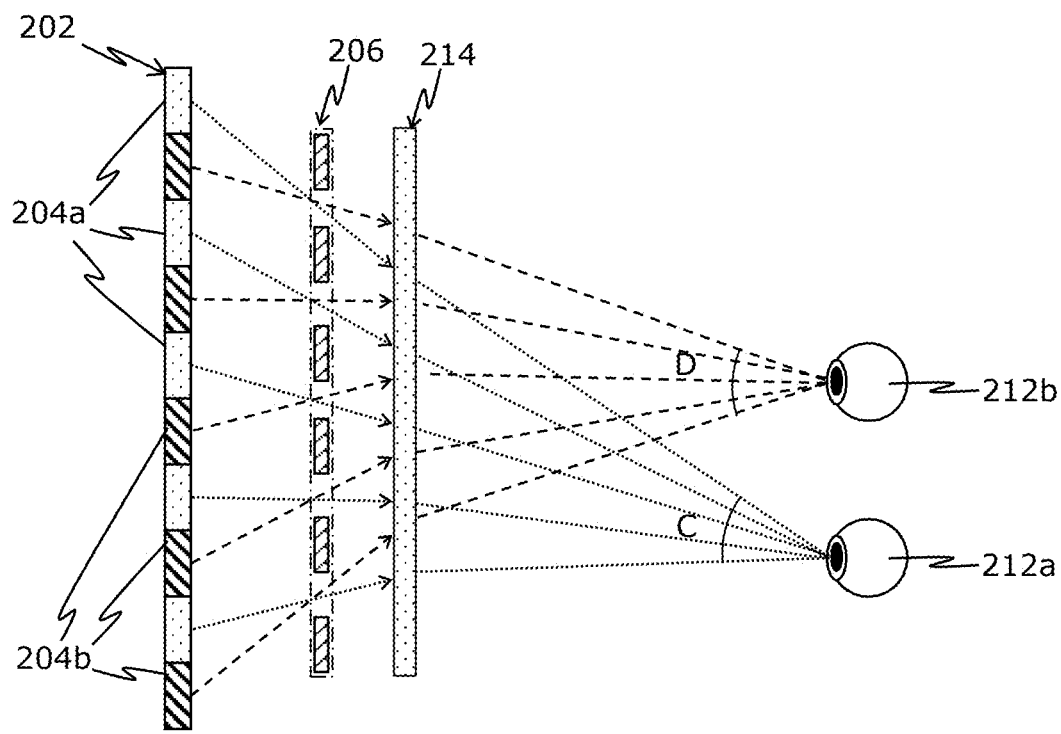

FIGS. 2A and 2B depict how light can be dynamically steered using an active optical element, in accordance with an embodiment of the present disclosure. For illustration purposes only, a light-emitting unit 202 (of a light field display unit) is shown as a micro-LED-based display (or similar), wherein the light-emitting unit 202 comprises an array of micro LEDs (or similar), and the plurality of photo-emitting cells are implemented as the micro-LEDs (or similar) of said array. A first set 204a of photo-emitting cells are employed to present a first virtual image to a first eye 212a of a given user, while a second set 204b of photo-emitting cells are employed to present a second virtual image to a second eye 212b of the given user. A parallax barrier 206 is arranged on an optical path of the light-emitting unit 202. The parallax barrier 206 comprises opaque portions 208 and transparent portions 210. An active optical element 214 is arranged on the optical path of the light-emitting unit 202.

For comparative purposes only, the active optical element 214 is not shown in FIG. 2A. Thus, FIG. 2A depicts original directions in which light corresponding to the photo-emitting cells of the first set 204a and light corresponding to the photo-emitting cells of the second set 204b would travel, if no dynamic light steering were performed using the active optical element 214. In FIG. 2A, an angular extent of a field of view of the light field display unit is depicted with an angle A for the first eye 212a and an angle B for the second eye 212b. As distance between the light field display unit and the eyes 212a-b of the given user increases, the angular extent of the field of view of the light field display unit decreases, and is depicted with another angle C for the first eye 212a and another angle D for the second eye 212b in FIG. 2B. The decrease in these angles correlate directly with a decrease in an angle that is formed between respective gaze vectors of the first eye 212a and the second eye 212b (when viewing light corresponding to neighbouring photo-emitting cells) when the distance between the light field display unit and the eyes 212a-b of the given user increases.

In FIG. 2B, it is shown that the active optical element 214 is employed to direct the light corresponding to the first set 204a of photo-emitting cells towards the first eye 212a and the light corresponding to the second set 204b of photo-emitting cells towards the second eye 212b. This allows for producing an autostereoscopic effect even when the eyes 212a-b of the given user are located relatively far away (for example, more than 1 metre away) from the light field display unit.

Figure 2C:
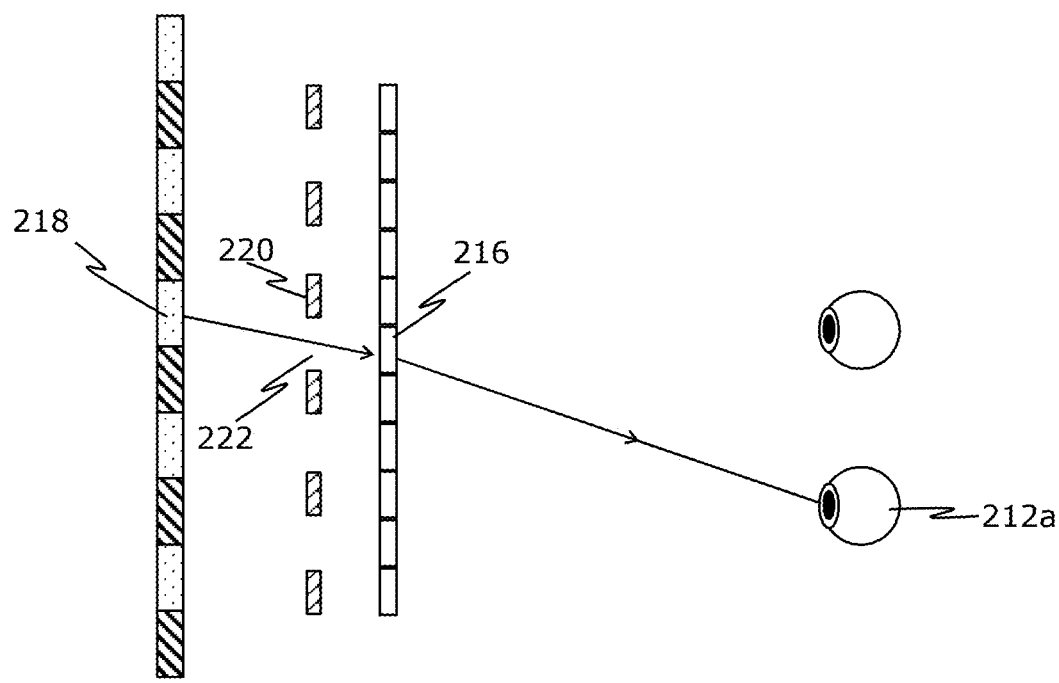
FIG. 2C depicts how a given portion of the active optical element that lies on an optical path of a given photo-emitting cell is controlled to direct light corresponding to the given photo-emitting cell along a given viewing direction, in accordance with an embodiment of the present disclosure.

Referring now to FIG. 2C, there is illustrated how a given first portion 216 of the active optical element 214 that lies on an optical path of a given first photo-emitting cell 218 of the first set 204a is controlled to direct light corresponding to the given first photo-emitting cell 218 along a first viewing direction, in accordance with an embodiment of the present disclosure. In this regard, the given first portion 216 is controlled based on at least one of: (i) a relative location of a group comprising a first opaque portion 220 and a first transparent portion 222 of the parallax barrier 206 that correspond to the given first photo-emitting cell 218 with respect to the first viewing direction, (iii) a width of the first opaque portion 220 and the first transparent portion 222 in the parallax barrier 206. Similarly (although not shown for the sake of clarity only), a given second portion of the active optical element 214 that lies on an optical path of a given second photo-emitting cell of the second set 204b is controlled to direct light corresponding to the given second photo-emitting cell along a second viewing direction. In this regard, the given second portion is controlled based on at least one of: (ii) a relative location of a group comprising a second opaque portion and a second transparent portion of the parallax barrier 206 that correspond to the given second photo-emitting cell with respect to the second viewing direction, (iii) a width of the second opaque portion and the second transparent portion in the parallax barrier 206.

Figure 2D:
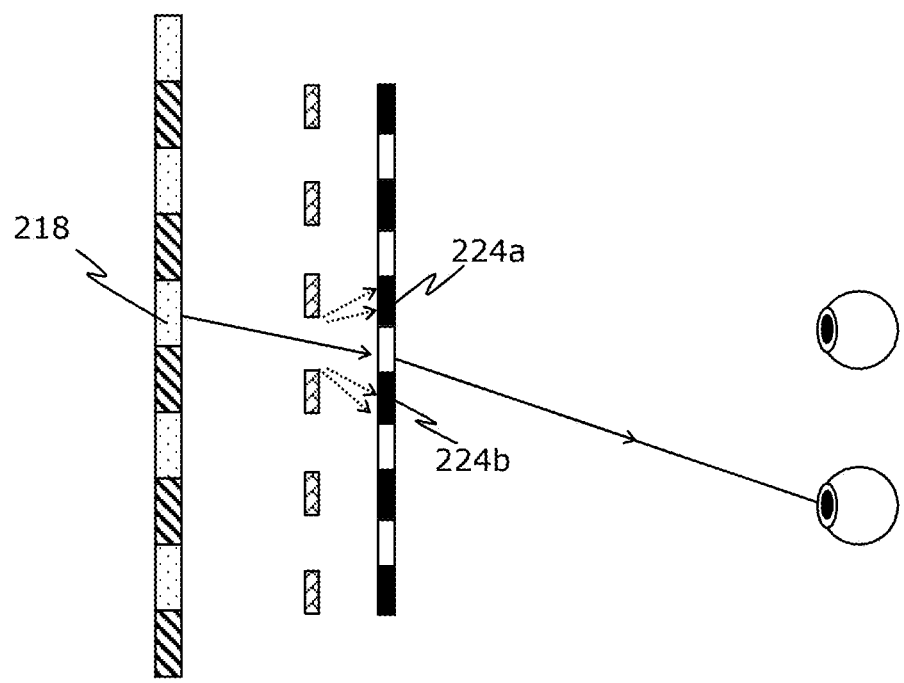
FIG. 2D depicts how diffraction can be mitigated, in accordance with an embodiment of the present disclosure.

Referring now to FIG. 2D, there is illustrated how diffraction can be mitigated, in accordance with an embodiment of the present disclosure. At least one third portion of the active optical element 214 (depicted as two separate third portions 224a and 224b) adjacent to the given first portion 216 of the active optical element 214 is controlled, to block a diffracted part of the light corresponding to the given first photo-emitting cell 218. Likewise, at least one fourth portion of the active optical element 214 adjacent to the given second portion of the active optical element 214 is controlled, to block a diffracted part of the light corresponding to the given second photo-emitting cell.

Figure 3:
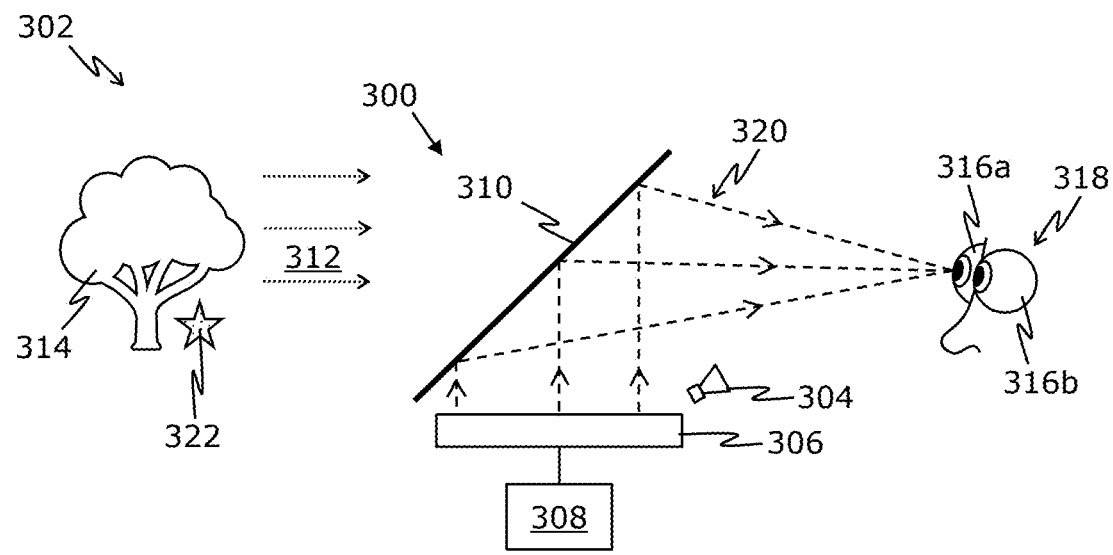
FIG. 3 depicts an exemplary environment in which a system incorporating dynamic light steering based on a relative location of a viewer can be employed, in accordance with an embodiment of the present disclosure.

Referring to FIG. 3, illustrated is an exemplary environment in which a system 300 incorporating dynamic light steering based on a relative location of a viewer can be employed, in accordance with an embodiment of the present disclosure. The system 300 is shown to be employed in a real-world environment 302. The system 300 comprises tracking means 304, a light field display unit 306, at least one processor (depicted as a processor 308) and optionally, an optical combiner 310. The tracking means 304 is shown to be implemented, for example, as at least one tracking camera. The optical combiner 310 is shown to be arranged on an optical path of the light field display unit 306 and on an optical path of a real-world light field 312 of the real-world environment 302. In the real-world environment 302, there are one or more real-world objects, depicted as a real-world object 314 (shown as a tree).

When the system 300 is in use, the tracking means 304 is utilised by the processor 308 to determine a relative location of a first eye 316a and of a second eye 316b of a user 318 with respect to an image plane of the light field display unit 306. A synthetic light field 320 presenting virtual images that represent at least one virtual object (depicted as a virtual object 322, shown as a star) is produced using the light field display unit 306. The optical combiner 310 is employed to reflect light emanating from a first set of photo-emitting cells of the light field display unit 306 towards the first eye 316a and light emanating from a second set of photo-emitting cells of the light field display unit 306 towards the second eye 316b, respectively, whilst optically combining the real-world light field 312 with a first part of the synthetic light field 320 produced by the light corresponding to the first set of photo-emitting cells and with a second part of the synthetic light field 320 produced by the light corresponding to the second set of photo-emitting cells.

FIGS. 2A-2D and 3 are merely examples, which should not unduly limit the scope of the claims herein. A person skilled in the art will recognize many variations, alternatives, and modifications of embodiments of the present disclosure.

Figure 4:
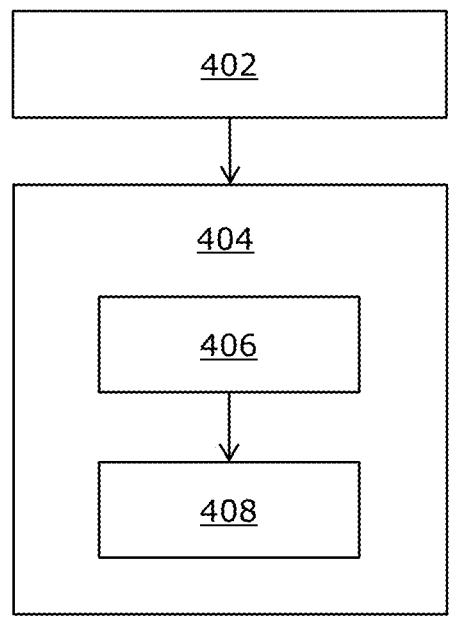
FIG. 4 illustrates steps of a method incorporating dynamic light steering based on relative location of viewer, in accordance with an embodiment of the present disclosure.

Referring to FIG. 4, illustrated are steps of a method incorporating dynamic light steering based on relative location of viewer, in accordance with an embodiment of the present disclosure. At step 402, tracking means is utilised to determine a relative location of a first eye and of a second eye of at least one user with respect to an image plane of a light field display unit, wherein the light field display unit comprises a light-emitting unit, a parallax barrier arranged on an optical path of the light-emitting unit, and an active optical element arranged on the optical path of the light-emitting unit. At step 404, a light field image is displayed via the light field display unit to produce a synthetic light field, whilst controlling the active optical element, based on the relative location of the first eye and of the second eye of the at least one user, to direct light corresponding to a first set of photo-emitting cells of the light field display unit towards the first eye and light corresponding to a second set of photo-emitting cells of the light field display unit towards the second eye. In accordance with step 404, the step of controlling the active optical element comprises steps 406 and 408. At step 406, a first viewing direction and a second viewing direction are determined for a given first photo-emitting cell belonging to the first set of photo-emitting cells and a given second photo-emitting cell belonging to the second set of photo-emitting cells, based on the relative location of the first eye and of the second eye of the at least one user with respect to the image plane of the light filed display unit, respectively. At step 408, a given first portion of the active optical element that lies on an optical path of the given first photo-emitting cell and a given second portion of the active optical element that lies on an optical path of the given second photo-emitting cell are controlled, to direct light corresponding to the given first photo-emitting cell along the first viewing direction and light corresponding to the given second photo-emitting cell along the second viewing direction, respectively. The given first portion and the given second portion are controlled based on at least one of: (i) a relative location of a group comprising a first opaque portion and a first transparent portion of the parallax barrier that correspond to the given first photo-emitting cell with respect to the first viewing direction, (ii) a relative location of a group comprising a second opaque portion and a second transparent portion of the parallax barrier that correspond to the given second photo-emitting cell with respect to the second viewing direction, (iii) a width of an opaque portion and a transparent portion in the parallax barrier.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
    tracking means;
    a light field display unit comprising:
        a light-emitting unit that is employed to emit light corresponding to a plurality of photo-emitting cells;
        a parallax barrier arranged on an optical path of the light-emitting unit, the parallax barrier comprising opaque portions and transparent portions; and
        an active optical element arranged on the optical path of the light-emitting unit; and
    at least one processor configured to:
        utilise the tracking means to determine a relative location of a first eye and of a second eye of at least one user with respect to an image plane of the light field display unit; and
        display a light field image via the light field display unit to produce a synthetic light field, whilst controlling the active optical element, based on the relative location of the first eye and of the second eye of the at least one user, to direct light corresponding to a first set of photo-emitting cells towards the first eye and light corresponding to a second set of photo-emitting cells towards the second eye,
    wherein when controlling the active optical element, the at least one processor is configured to:
        determine a first viewing direction and a second viewing direction for a given first photo-emitting cell belonging to the first set of photo-emitting cells and a given second photo-emitting cell belonging to the second set of photo-emitting cells, based on the relative location of the first eye and of the second eye of the at least one user with respect to the image plane of the light filed display unit, respectively; and
        control a given first portion of the active optical element that lies on an optical path of the given first photo-emitting cell and a given second portion of the active optical element that lies on an optical path of the given second photo-emitting cell, to direct light corresponding to the given first photo-emitting cell along the first viewing direction and light corresponding to the given second photo-emitting cell along the second viewing direction, respectively, wherein the given first portion and the given second portion are controlled based on at least one of: (i) a relative location of a group comprising a first opaque portion and a first transparent portion of the parallax barrier that correspond to the given first photo-emitting cell with respect to the first viewing direction, (ii) a relative location of a group comprising a second opaque portion and a second transparent portion of the parallax barrier that correspond to the given second photo-emitting cell with respect to the second viewing direction, (iii) a width of an opaque portion and a transparent portion in the parallax barrier.

2. The system of claim 1, wherein the first viewing direction for the given first photo-emitting cell belonging to the first set of photo-emitting cells and the second viewing direction for the given second photo-emitting cell belonging to the second set of photo-emitting cells are determined further based on a location of the given first photo-emitting cell and a location of the given second photo-emitting cell in the light-emitting unit, respectively.

3. The system of claim 1, further comprising an optical combiner arranged on an optical path of the light field display unit and on an optical path of a real-world light field of a real-world environment, wherein the optical combiner is employed to reflect the light corresponding to the first set of photo-emitting cells and the light corresponding to the second set of photo-emitting cells towards the first eye and the second eye, respectively, whilst optically combining the real-world light field with a first part of the synthetic light field produced by the light corresponding to the first set of photo-emitting cells and with a second part of the synthetic light field produced by the light corresponding to the second set of photo-emitting cells.

4. The system of claim 1, wherein the at least one user comprises a plurality of users, wherein the at least one processor is configured to display different light field images for different users via the light field display unit, whilst controlling the active optical element, based on relative locations of first eyes and second eyes of the different users, by employing temporal multiplexing.

5. The system of claim 1, wherein the at least one user comprises a plurality of users, wherein the at least one processor is configured to:
detect when eyes of at least one of the plurality of users are closed or the at least one of the plurality of users is not looking towards the image plane; and
when it is detected that the eyes of the at least one of the plurality of users are closed or the at least one of the plurality of users is not looking towards the image plane,
identify a given photo-emitting cell that corresponds to a given eye of the at least one of the plurality of users; and
dim the given photo-emitting cell, whilst skipping controlling a given portion of the active optical element that lies on an optical path of the given photo-emitting cell.

6. The system of claim 1, wherein the at least one user comprises a plurality of users, wherein the at least one processor is configured to:
detect when eyes of at least one of the plurality of users are closed or the at least one of the plurality of users is not looking towards the image plane; and
when it is detected that the eyes of the at least one of the plurality of users are closed or the at least one of the plurality of users is not looking towards the image plane,
identify a given photo-emitting cell that corresponds to a given eye of the at least one of the plurality of users; and
utilise the given photo-emitting cell to produce additional light to supplement light emanating from a given neighbouring photo-emitting cell that corresponds to at least one other of the plurality of users, whilst controlling a given portion of the active optical element that lies on an optical path of the given photo-emitting cell, based on a viewing direction for the given neighbouring photo-emitting cell, to direct light emanating from the given photo-emitting cell along said viewing direction.

7. The system of claim 1, wherein the active optical element is implemented as a liquid-crystal optical element.

8. The system of claim 1, wherein the at least one processor is configured to:
control at least one third portion of the active optical element that is adjacent to said given first portion of the active optical element, to block a diffracted part of the light corresponding to the given first photo-emitting cell; and
control at least one fourth portion of the active optical element that is adjacent to said given second portion of the active optical element, to block a diffracted part of the light corresponding to the given second photo-emitting cell.

9. A method comprising:
utilising tracking means to determine a relative location of a first eye and of a second eye of at least one user with respect to an image plane of a light field display unit, the light field display unit comprising a light-emitting unit, a parallax barrier arranged on an optical path of the light-emitting unit, and an active optical element arranged on the optical path of the light-emitting unit; and
displaying a light field image via the light field display unit to produce a synthetic light field, whilst controlling the active optical element, based on the relative location of the first eye and of the second eye of the at least one user, to direct light corresponding to a first set of photo-emitting cells of the light field display unit towards the first eye and light corresponding to a second set of photo-emitting cells of the light field display unit towards the second eye,
wherein the step of controlling the active optical element comprises:
determining a first viewing direction and a second viewing direction for a given first photo-emitting cell belonging to the first set of photo-emitting cells and a given second photo-emitting cell belonging to the second set of photo-emitting cells, based on the relative location of the first eye and of the second eye of the at least one user with respect to the image plane of the light filed display unit, respectively; and
controlling a given first portion of the active optical element that lies on an optical path of the given first photo-emitting cell and a given second portion of the active optical element that lies on an optical path of the given second photo-emitting cell, to direct light corresponding to the given first photo-emitting cell along the first viewing direction and light corresponding to the given second photo-emitting cell along the second viewing direction, respectively, wherein the given first portion and the given second portion are controlled based on at least one of: (i) a relative location of a group comprising a first opaque portion and a first transparent portion of the parallax barrier that correspond to the given first photo-emitting cell with respect to the first viewing direction, (ii) a relative location of a group comprising a second opaque portion and a second transparent portion of the parallax barrier that correspond to the given second photo-emitting cell with respect to the second viewing direction, (iii) a width of an opaque portion and a transparent portion in the parallax barrier.

10. The method of claim 9, wherein the first viewing direction for the given first photo-emitting cell belonging to the first set of photo-emitting cells and the second viewing direction for the given second photo-emitting cell belonging to the second set of photo-emitting cells are determined further based on a location of the given first photo-emitting cell and a location of the given second photo-emitting cell in the light-emitting unit, respectively.

11. The method of claim 9, wherein an optical combiner is employed to reflect the light corresponding to the first set of photo-emitting cells and the light corresponding to the second set of photo-emitting cells towards the first eye and the second eye, respectively, whilst optically combining a real-world light field of a real-world environment with a first part of the synthetic light field produced by the light corresponding to the first set of photo-emitting cells and with a second part of the synthetic light field produced by the light corresponding to the second set of photo-emitting cells, wherein the optical combiner is arranged on an optical path of the light field display unit and on an optical path of the real-world light field of the real-world environment.

12. The method of claim 9, wherein the at least one user comprises a plurality of users, wherein the method further comprises displaying different light field images for different users via the light field display unit, whilst controlling the active optical element, based on relative locations of first eyes and second eyes of the different users, by employing temporal multiplexing.

13. The method of claim 9, wherein the at least one user comprises a plurality of users, wherein the method further comprises:
   detecting when eyes of at least one of the plurality of users are closed or the at least one of the plurality of users is not looking towards the image plane; and
   when it is detected that the eyes of the at least one of the plurality of users are closed or the at least one of the plurality of users is not looking towards the image plane,
      identifying a given photo-emitting cell that corresponds to a given eye of the at least one of the plurality of users; and
      dimming the given photo-emitting cell, whilst skipping controlling a given portion of the active optical element that lies on an optical path of the given photo-emitting cell.

14. The method of claim 9, wherein the at least one user comprises a plurality of users, wherein the method further comprises:
   detecting when eyes of at least one of the plurality of users are closed or the at least one of the plurality of users is not looking towards the image plane; and
   when it is detected that the eyes of the at least one of the plurality of users are closed or the at least one of the plurality of users is not looking towards the image plane,
      identifying a given photo-emitting cell that corresponds to a given eye of the at least one of the plurality of users; and
      utilising the given photo-emitting cell to produce additional light to supplement light emanating from a given neighbouring photo-emitting cell that corresponds to at least one other of the plurality of users, whilst controlling a given portion of the active optical element that lies on an optical path of the given photo-emitting cell, based on a viewing direction for the given neighbouring photo-emitting cell, to direct light emanating from the given photo-emitting cell along said viewing direction.

15. The method of claim 9, wherein the active optical element is implemented as a liquid-crystal optical element.

16. The method of claim 9, further comprising:
   controlling at least one third portion of the active optical element that is adjacent to said given first portion of the active optical element, to block a diffracted part of the light corresponding to the given first photo-emitting cell; and
   controlling at least one fourth portion of the active optical element that is adjacent to said given second portion of the active optical element, to block a diffracted part of the light corresponding to the given second photo-emitting cell.

\* \* \* \* \*